United States Patent
Seiler

[11] 3,814,198
[45] June 4, 1974

[54] SKI CYCLE
[76] Inventor: Virgil R. Seiler, 228 West Ave., Waite Park, Minn. 56387
[22] Filed: Dec. 16, 1971
[21] Appl. No.: 208,551

[52] U.S. Cl. ................................. 180/6 A, 301/50
[51] Int. Cl. ........................................ B62m 27/02
[58] Field of Search.......... 180/6 A, 6 R; 280/12.14; 301/39 R, 50

[56] References Cited
UNITED STATES PATENTS

| | | | |
|---|---|---|---|
| 490,240 | 1/1893 | Bendure et al. | 280/12.14 X |
| 639,672 | 12/1899 | Dietrich | 288/12.14 X |
| 904,351 | 11/1908 | McCoy | 280/12.14 |
| 1,441,538 | 1/1923 | Smith | 280/28 UX |
| 1,816,300 | 7/1931 | Stokes | 301/50 |
| 1,916,643 | 7/1933 | Steele | 180/6 R |
| 2,381,639 | 8/1945 | Bower | 301/50 |
| 2,435,783 | 2/1948 | Hintze | 301/39 R X |
| 3,190,676 | 6/1965 | Junge | 180/6 A X |

*Primary Examiner*—Leo Friaglia
*Attorney, Agent, or Firm*—Walter N. Kirn, Jr.

[57] ABSTRACT

A motorized bicycle converted to a snow travelling vehicle having a front ski, a rear cleated drive wheel, and a pair of rear skis mounted laterally of said drive wheel.

4 Claims, 9 Drawing Figures

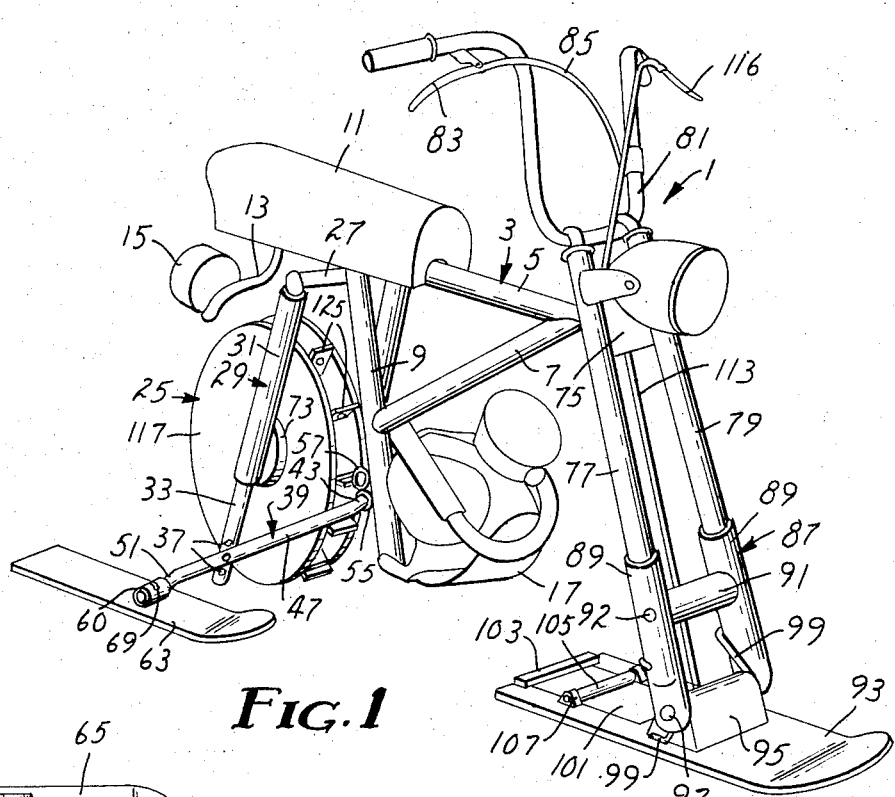
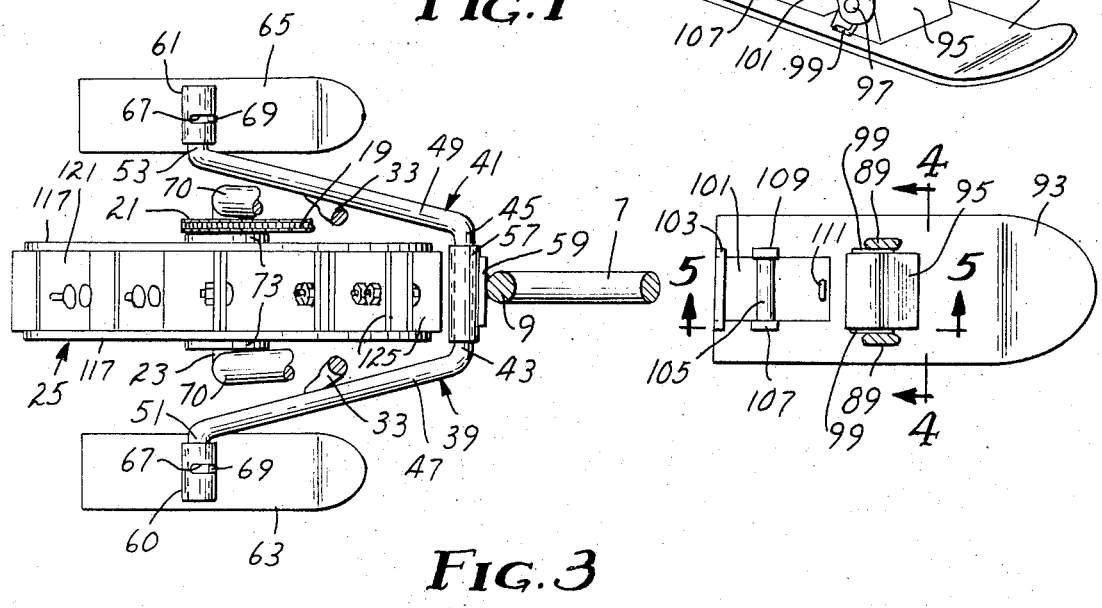

INVENTOR
VIRGIL R. SEILER
BY Walter N. Kirn Jr.
ATTORNEY

INVENTOR.
VIRGIL R. SEILER
BY Walter N. Kirn Jr.
ATTORNEY

SKI CYCLE

This invention relates to a vehicle adapted for travel on snow or like surfaces and in particular to a converted motorized bicycle-type vehicle adapted for travel over such surfaces.

The use of motorized wheel vehicles for recreational travel over unpaved roads and trails has assumed even increasing popularity in recent years. So too has the use of vehicles for traveling over snow. Except for certain so-called all-terrain vehicles which in general are slow, cumbersome machines, vehicles of generally different design are used for snow and non-snow travel. Various designs have been offered over the years for converting a non-snow vehicle to a snow vehicle. See U.S. Pat. Nos. 3,336,994 and 3,412,820, for example. The ability to convert a vehicle from snow to non-snow travel and vice versa is desired to avoid the cost of two separate vehicles. To date, however, the attempts to provide such converted vehicles have not been particularly successful due to the complicated and expensive nature of the converting means and the compromises in design which make the converted vehicle undesirable from a performance standpoint.

It is the primary object of this invention to provide means for readily and economically converting a non-snow motorized wheeled vehicle to a snow traveling vehicle.

This and other objects to be made apparent hereinafter are provided in one embodiment of this invention by a vehicle adapted for self-propulsion over snow and like surfaces, said vehicle comprising a main frame portion, steerable front mounting means and rear mounting means connected to said main frame, ski means mounted on said steerable front mounting means, wheel means mounted on said rear mounting means, said wheel means having radially extending snow-engaging cleat means associated therewith, self-propelled drive means operatively connected to said wheel means to turn same whereby said cleat means engage the snow or like surface, and a pair of rear skis mounted on said frame and located on opposing lateral sides of said wheel means.

To promote a fuller understanding of the invention, reference is made to the attached drawings wherein:

FIG. 1 is a perspective view showing skis mounted to a motor driven bike;

FIG. 1 is an elevational view of a motor bike as seen from the left;

FIG. 3 is an enlarged sectional view taken along line 3—3 of FIG. 2 with some parts removed;

Figure 2:
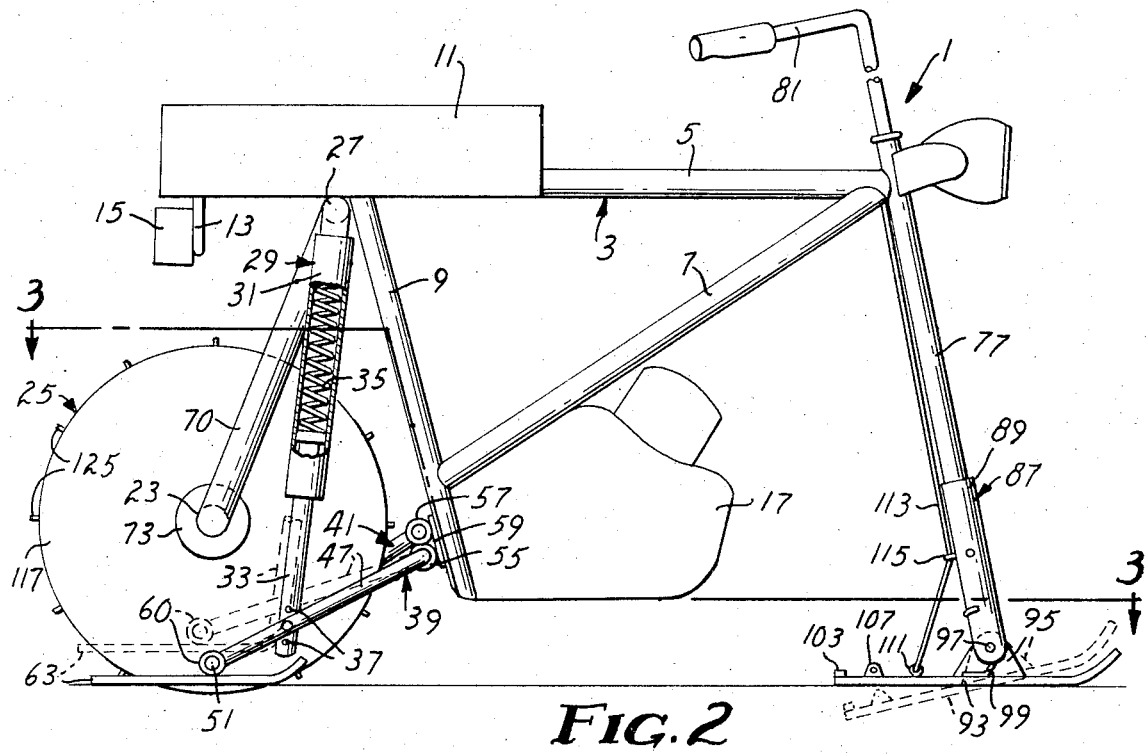
Figure 4:
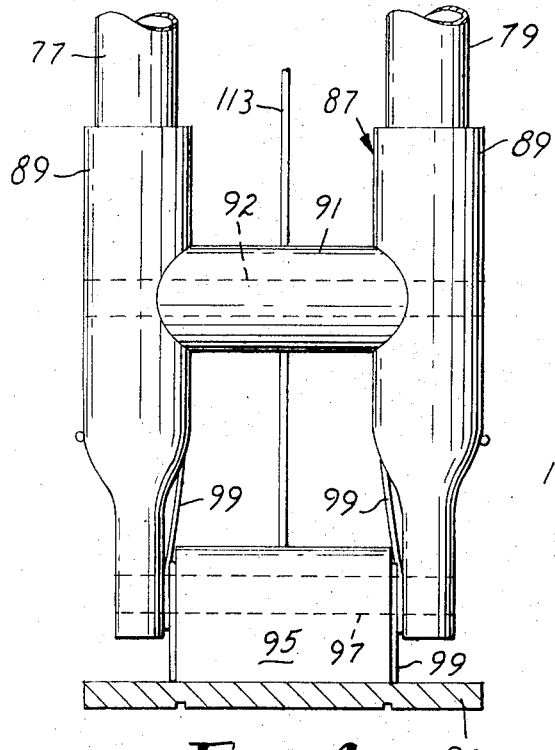
FIG. 4 is an enlarged sectional view taken along line 4—4 of FIG. 3.
Figure 5:
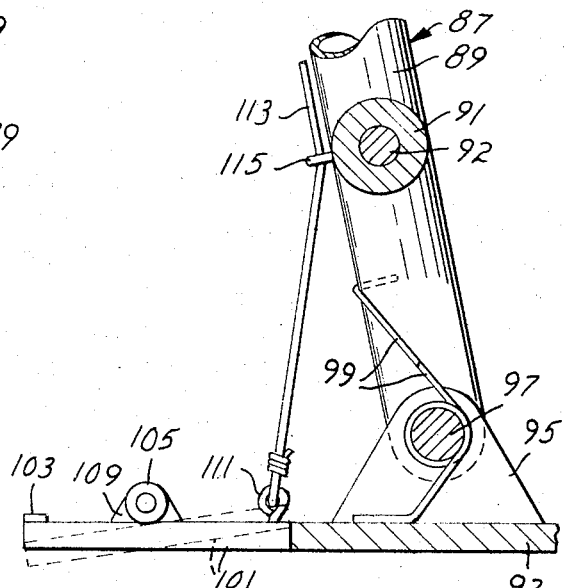
FIG. 5 is an enlarged sectional view taken along line 5—5 of FIG. 3.

Referring to the drawings, a converted motorized bicycle, generally designated by the numeral 1, has a standard main frame 3 including tubular metal pieces 5, 7 and 9. Attached to longitudinally extending piece 5 of frame 3 is seat 11 and arm 13 to which is attached a rear light or reflector 15.

Mounted on piece 9 of frame 3 below the juncture of frame piece 7 is a conventional internal combustion engine 17 having a driven sprocket (not shown). A link drive chain 19 extends from the driven sprocket of engine 17 to sprocket wheel 21 mounted on axle 23 of wheel 25, the details of which will be described hereinafter.

Mounted near the top of frame piece 9 is transverse mounting piece 27 of tubular metal construction. Pivotally attached to opposing ends of mounting piece 27 are shock absorbers 29, each including an outer sheath 31, a shaft 33, and a compression spring 35. This construction forces shaft 33 outwardly to keep skis 63 and 65 at a level horizontal to wheel 25. To permit adjustments, shaft 33 has a plurality of spaced apertures 37 each of which can serve to attach shaft 33 to arm members 39 and 41. Arm members 39 and 41 are tubular metal construction and include transverse sections 43 and 45, downward and rearward angle sections 47 and 49, and terminal ear sections 51 and 53, respectively. Transverse sections 43 and 45 are rotatably mounted in collars 55 and 57, respectively, the latter being mounted one above the other by suitable means such as welding or bolting to plate 59 which is fixedly mounted on frame piece 9. The use of two arm members 39 and 41 and two collars 55 and 57 is desired to simplify the construction and design of the converted unit. By employing two arms each terminating at frame piece 9, the collars can be placed around the transverse sections 43 and 45 readily without sliding them from one of the ends of an integral arm. Mounting collars 55 and 57 one above the other rather than side by side is desirable in view of the limited lateral space available on plate 59 and frame piece 9. Moreover, greater strength is achieved by having the collars in as close an alignment as possible with frame piece 9. Angle sections 47 and 49 must be complementarily bent so that terminal ear sections 51 and 53 are in essentially the same horizontal plane.

Terminal ear sections 51 and 53 of arms 39 and 41, respectively, are pivotally mounted in collars 60 and 61, respectively. Collars 60 and 61, mounted on skis 63 and 65, respectively, each have slots 67 cut therein in which are positioned pins 69. This conventional arrangement prevents the tips of skis 63 and 65 from falling or rotating downwardly yet allowing the ski tips to swing upwardly about 30° when the skis are off the snow or other ground surface, thus preventing the tips from digging into the snow on re-contact therewith.

Wheel 25 is affixed to bicycle 1 by the standard means for mounting of a rear-wheel to a motorized bicycle. A fork member 70 fixedly attached to mounting piece 27 is mounted on opposing ends of axle 23 of wheel 25. Interior of the connections of fork member 70 to axle 23 are hubs 73 of wheel 25.

The forward end of frame piece 5 is fixedly and centrally connected to plate 75 mounted near the top and spanning struts 77 and 79. A standard handle bar 81 is mounted for stearing to struts 77 and 79 by standard means. Attached to handlebar 81 is hand throttle 83 connected by wire 85 to engine 17 for conventional regulation of the engine speed.

Connected to the lower ends of struts 77 and 79 is H-shaped member 87 having parallel sleeve portions 89 and crossbar 91. Attachment of member 87 to struts 77 and 79 is accomplished by screws 92 which threadably pass through aligned apertures in sleeve portions 89 and struts 77 and 79 and into crossbar 91.

Forward ski 93 has mounted thereto housing 95 to the lateral ends of which sleeve portions 89 are pivotally mounted by pin 97. Coiled around each end of pin 97 are springs 99 which bear gainst ski 93 and sleeves 89 such that ski 93 is prevented from rotating downwardly when disengaged from the snow or other surface.

Rearward of housing 95 ski 93 is bifurcated with flap 101 being located in the slot formed by such bifurcation. Cross-brace 103 is mounted across the rearward opening of ski 93 as well as across the end of flap 101 to provide structural stability as well as serving as a stop for flap 101. Intermediate, preferably midway, the ends of flap 101 is located pivot pin 105 which is attached to flap 101 and is pivotally mounted in bearing members 107 and 109. At a forward central location on flap 101 is mounted screw eye 111 to which is connected cord 113 which passes upwardly through guide 115 on crossbar 91 and along handle bar 81 to retractable attachment with finger grip member 116. By squeezing grip member 116, cord 113 is pulled upwardly causing flap 101 to pivot about pin 105 thereby raising the forward portion of flap 101 and lowering the rearward portion below the plane of ski 93. The lowering rearward portion of flap 101 serves as breaking and control means for the forward movement of the bike 1.

Figure 6:
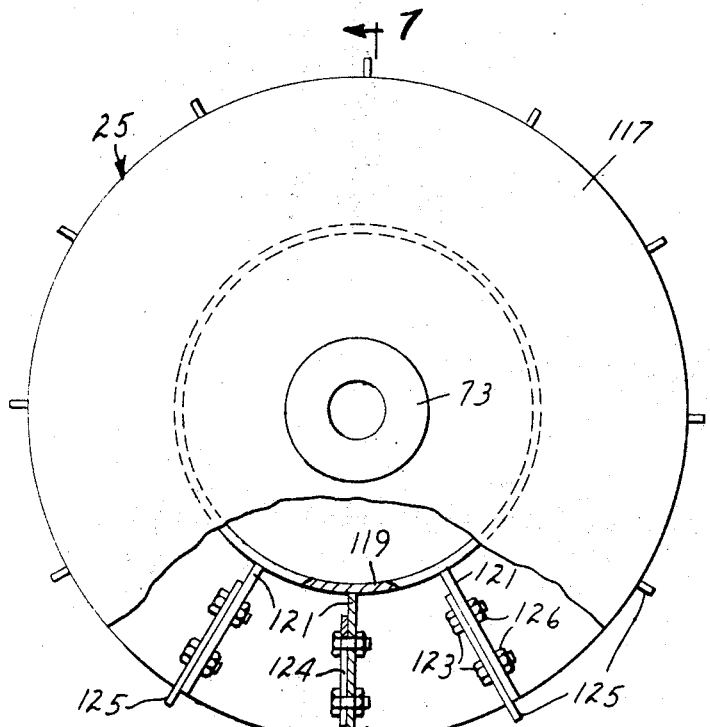
FIG. 6 is an enlarged elevational view of the rear wheel, some parts broken away and shown in section.
Figure 7:
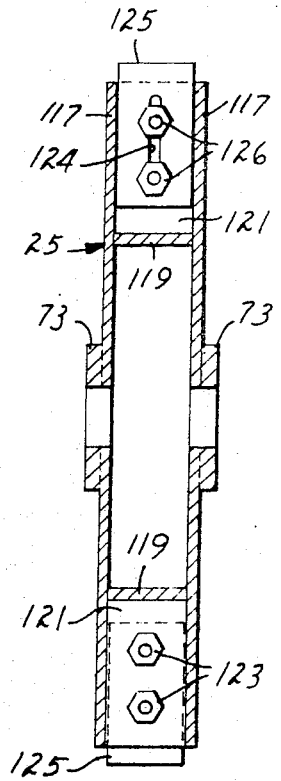
FIG. 7 is a sectional view taken along line 7—7 of FIG. 6.

Referring to FIGS. 6 and 7, there is illustrated wheel 25 in greater detail. Wheel 25 includes rim discs 117 journalled to receive axle 23. Hubs 73, bonded to opposing sides of discs 117, are journalled to receive axle 23. Between discs 117 is welded or otherwise bonded thereto ring 119 to form a rim base for wheel 25. Mounted along the circumference of ring 119 and extending radially outwardly therefrom are plates 121. Preferably plates 121 are equally spaced around the circumference of ring 119. Mounted to plates 121 by bolts 123 are fins 125 which together provide cleat means extending beyond discs 117 (the rim walls of wheel 25) as well as below the horizontal plane in which skis 63 and 65 are located. As shown in FIG. 1, fins 125 engage the snow or other ground surface providing the driving force for movement of bike 1.

Fins 125 are each provided with elongated grooves 124 through which pass bolts 123. Grooves 124 are slightly wider than the diameter of bolts 123 such that bolts can be slidably longitudinally adjusted to vary the length of fins 125 extending from plates 121. The dimensions of plates 121, fins 125, grooves 124, and the space between ring 119 and the perimeter of discs 117 (the rim base and rim walls, respectively, of wheel 25) should preferably be such that fins 125 can be fully retracted to a point at or within the walls of the rim provided by the ring 119 and discs 117. By adjusting the tightness of nuts 126, the force necessary to retract fins 125 can be predetermined. There may be instances where it would be desirable that one or more fins 125 would be forced into a fully retracted position at least temporarily to avoid damage thereto such as when striking a hard object such as a rock or bare pavement. It may also be desirable in certain instances to adjust nuts 126 such that fins 125 are moved outwardly by the centrifugal force of the rotating wheel 25. It should be noted that the two-piece cleat arrangement provided by plates 121 and fins 125 may be eliminated in favor of a single cleat.

Figure 8:
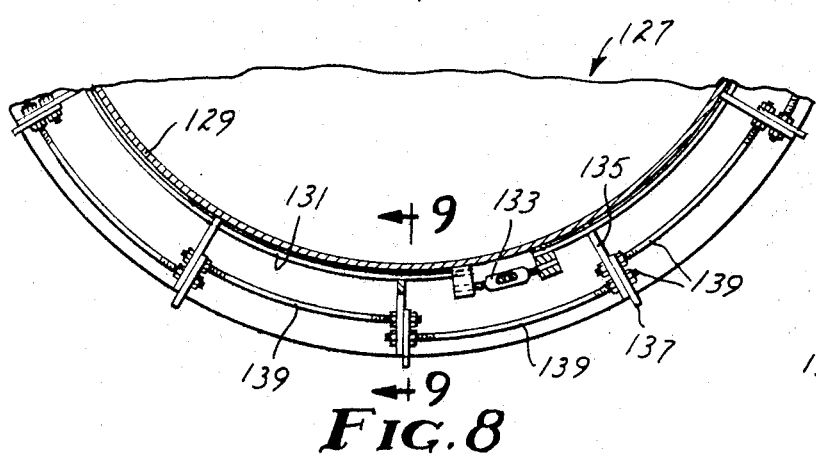
FIG. 8 is an enlarged transverse sectional view of a portion of a modified rear wheel.
Figure 9:
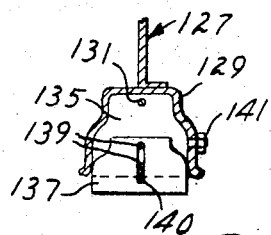
FIG. 9 is a sectional view taken along line 9—9 of FIG. 8.

Referring to FIGS. 8 and 9 there is shown a portion of a modified rim-type rear wheel 127. Stretched tautly around the base of rim 129 is rigid, strong cable 131. Opposing ends of cable 131 are connected to tightener 133 to enable ease of mounting and tension adjustment of cable 131. Rigidly attached to cable 131 at spaced intervals and extending radially outwardly from the base of rim 129 are plates 135. Plates 135 are made to fit snugly into rim 129. For stability one can attach bolt 141 through the valve stem opening which will stabilize all plates 135 through bolts 139. Connected to plates 135 are fins 137 extending beyond the perimeter of the walls of rim 129. Connection is provided by elongated double-threaded spacer bolts 139 which pass through elongated grooves 140 in fins 137 and matching holes in plates 135. Bolts 139 are preferably smaller in width than grooves 140 to permit the fins 137 to be slidable therein in the same manner as noted above in describing the cleat arrangement of FIGS. 6 and 7. Any one set of plates 135 and fins 137 shares an elongated spacer bolt with an adjacent set of plates and fins as shown. It is to be understood that in place of the plate and fin arrangement, a single, unitary cleat may be employed if desired.

A conventional motorcycle or bike can be readily and inexpensively converted to a snowbike of this invention. In the embodiment of FIGS. 1–7, the parts providing the adaption to the snow vehicle of the invention include wheel 25 and its attendant parts, arm members 39 and 41, collars 55, 57, 60, 61, skis 63 and 65, H-shaped member 87, and ski 93, including flap member 101. Collars 55 and 57 can be permanently mounted on the frame for further ease of conversion. Wheel 25 can be replaced by the conventional wheel of FIGS. 8 and 9, and the extra parts as described conveniently mounted for further cost savings. In addition to being economical and readily convertible from a non-snow to snow vehicle, the vehicle is very stable and easy to operate owing to the use of rear skis on either side of the cleated drive wheel.

What is claimed is:

1. A vehicle adapted for self-propulsion over snow and like surfaces, said vehicle comprising a main frame portion, steerable front mounting means and rear mounting means connected to said main frame, ski means mounted on said steerable front mounting means, wheel means mounted on said rear mounting means, said wheel means having radially extending snow-engaging cleat means associated therewith, self-propelled drive means operatively connected to said wheel means to turn same whereby said cleat means engage the snow or like surface, and a pair of rear skis mounted on said frame and located on opposing lateral sides of said wheel means; and securing means for radially retractably securing said cleat means to said wheel means, said securing means having a setting holding said cleat means beyond said rim wall when the force on said cleat means is of a first magnitude and allowing retracting of said cleat means when said force is of a magnitude greater than said first magnitude, whereby said cleat means can be protected from damage by forces having a magnitude greater than said first magnitude.

2. The vehicle of claim 1 wherein said cleat means is rigidly attached to cable means, said cable means being removeably and adjustably positioned around the rim base of said wheel means.

3. The vehicle of claim 2 wherein said cleat means comprises two sections, a first section rigidly attached to said cable means, and a second section longitudinally extendably attached to said first section.

4. The vehicle of claim 1 wherein said cleat means is provided with longitudinally extending slot means and said securing means comprises at least two nut and bolt means mounted in said slot means.

* * * * *